United States Patent
Gordon et al.

(10) Patent No.: US 10,289,393 B2
(45) Date of Patent: May 14, 2019

(54) GPU-EXECUTED PROGRAM SEQUENCE CROSS-COMPILATION

(71) Applicant: Microsoft Technology Licensing, LLC, Redmond, WA (US)

(72) Inventors: Matthew Gordon, Redmond, WA (US); Aaron Blake Stover, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 36 days.

(21) Appl. No.: 15/630,797

(22) Filed: Jun. 22, 2017

(65) Prior Publication Data
US 2018/0373513 A1  Dec. 27, 2018

(51) Int. Cl.
  *G06F 9/445* (2018.01)
  *G06F 8/41* (2018.01)
  *G06T 15/00* (2011.01)
(52) U.S. Cl.
  CPC .......... *G06F 8/4435* (2013.01); *G06T 15/005* (2013.01)
(58) Field of Classification Search
  USPC ....................................................... 717/149
  See application file for complete search history.

(56) References Cited

U.S. PATENT DOCUMENTS

| | | | |
|---|---|---|---|
| 7,616,206 B1 | 11/2009 | Danilak | |
| 7,649,533 B2 | 1/2010 | Engel et al. | |
| 7,746,347 B1 | 6/2010 | Brown et al. | |
| 2005/0140688 A1 | 6/2005 | Pallister | |
| 2006/0055695 A1 | 3/2006 | Abdalla et al. | |
| 2008/0158236 A1 | 7/2008 | Bakalash et al. | |
| 2010/0153934 A1 | 6/2010 | Lachner | |
| 2013/0159685 A1 | 6/2013 | Ju et al. | |
| 2014/0146062 A1 | 5/2014 | Kiel et al. | |
| 2014/0347371 A1 | 11/2014 | Stenson et al. | |

(Continued)

FOREIGN PATENT DOCUMENTS

| | | |
|---|---|---|
| CN | 103389908 A | 11/2013 |
| EP | 2109304 A1 | 10/2009 |

OTHER PUBLICATIONS

"Halide cross-compilation for GPU", http://stackoverflow.com/questions/42651785/halide-cross-compilation-for-gpu, Retrieved on: May 16, 2017, 2 pages.

(Continued)

*Primary Examiner* — Chuck O Kendall
(74) *Attorney, Agent, or Firm* — Alleman Hall Creasman & Tuttle LLP

(57) ABSTRACT

According to one embodiment of the present disclosure, a computing system is provided, including a graphical processing unit (GPU) and a processor. The processor may be configured to execute a run-time executable cross-compiler to receive a GPU-executed program of a plurality of GPU-executed programs. The processor may be further configured to receive summary data associated with the GPU-executed program. The summary data may include a sequence in which the plurality of GPU-executed programs are configured to be executed. Based at least in part on the GPU-executed program and the summary data, the processor may be further configured to generate a translated GPU-executed program.

20 Claims, 7 Drawing Sheets

(56) References Cited

U.S. PATENT DOCUMENTS

| | | | |
|---|---|---|---|
| 2014/0347375 A1 | 11/2014 | Stenson et al. | |
| 2014/0354669 A1 | 12/2014 | Galazin et al. | |
| 2015/0199787 A1* | 7/2015 | Pechanec | G06F 9/5044 |
| | | | 345/522 |
| 2015/0286491 A1 | 10/2015 | Anyuru | |
| 2016/0042549 A1 | 2/2016 | Li et al. | |
| 2016/0117152 A1 | 4/2016 | Baker | |
| 2016/0364216 A1 | 12/2016 | Howes | |
| 2016/0364831 A1 | 12/2016 | Spanton et al. | |
| 2017/0116702 A1 | 4/2017 | Viggers et al. | |

OTHER PUBLICATIONS

Thacker, Jim, "Otoy is cross-compiling CUDA for non-Nvidia GPUs", http://www.cgchannel.com/2016/03/otoy-is-reverse-engineering-cuda-for-non-nvidia-gpus/, Published on: Mar. 11, 2016, 6 pages.

"Nvidia Cuda", http://web.archive.org/web/20100618230844/http://moss.csc.ncsu.edu/~mueller/cluster/nvidia/2.3/cudatoolkit_release_notes_linux.txt, Published on: Jun. 18, 2010, 3 pages.

"Unity Manual", https://docs.unity3d.com/530/Documentation/Manual/ComputeShaders.html, Retrieved on: May 16, 2017, 4 pages.

"Cross Platform Shaders in 2014", http://aras-p.info/blog/2014/03/28/cross-platform-shaders-in-2014/, Published on: Mar. 28, 2014, 5 pages.

Bjørge, Marius, "Porting a Graphics Engine to the Vulkan API", https://community.arm.com/graphics/b/blog/posts/porting-a-graphics-engine-to-the-vulkan-api, Published on: Feb. 16, 2016, 8 pages.

"AMD GCN3 ISA Architecture Manuel" AMD Accelerated Parallel Processing Technology; retrieved at <<http://gpuopen.com/compute-product/amd-gcn3-isa-architecture-manual/>>, Version 1.1, Aug. 2016, 2 pages.

Kyunghyun, Cho, "Introduction to Neural Machine Translation with GPUs (Part 1)", Retrieved from: <<https://devblogs.nvidia.com/parallelforall/introduction-neural-machine-translation-with-gpus/>>, May 27, 2015, 7 Pages.

Nickolls, J. et al., "Graphics and Computing GPUs," In Book: Computer Organization and Design: The Hardware/ Software Interface, DA Patterson and JL Hennessy, 4th Ed., Nov. 17, 2008, 82 pages.

Farooqui, N. et al., "Dynamic Instrumentation and Optimization for GPU Applications," In Proceedings of the 4th Workshop on Systems for Future Multicore Architectures, Apr. 13, 2014, 6 pages.

"Why do AGAL shaders need to be compiled just-in-time?", Stack Overflow Website, Available Online at https:/stackoverflow.com/questions/23602735/why-do-agal-shaders-need-to-be-compiled-just-in-time, May 12, 2014, 1 page.

"A Generic and Flexible Shader Cross Compiler Library/Tool", Git-Hub, Inc. Website, Available Online at https://github.com/lotsopa/Savvy, Aug. 27, 2015, 2 pages.

"Non Final Office Action Issued in U.S. Appl. No. 15/630,818", dated May 3, 2018, 12 pages.

"Notice of Allowance Issued in U.S. Appl. No. 15/630,836", dated Jun. 19, 2018, 10 pages.

* cited by examiner

US 10,289,393 B2

GPU-EXECUTED PROGRAM SEQUENCE CROSS-COMPILATION

BACKGROUND

When a program is executed on a graphics processing unit (GPU), the program is typically executed as part of a sequence of programs. For example, program A may be sequenced with program B or C. When the sequence is (A, B), A is "bound" to B. When the sequence is (A, C), A is "bound" to C. When a program is bound into a particular sequence, the program may communicate with the other programs differently from in other possible sequences. For example, the program may decode or encode its inputs and/or outputs differently. The rules of sequence binding may be determined at least in part by GPU architecture.

SUMMARY

According to one embodiment of the present disclosure, a computing system is provided, comprising a graphical processing unit (GPU) and a processor. The processor may be configured to execute a run-time executable cross-compiler to receive a GPU-executed program of a plurality of GPU-executed programs. The processor may be further configured to receive summary data associated with the GPU-executed program. The summary data may include a sequence in which the plurality of GPU-executed programs are configured to be executed. Based at least in part on the GPU-executed program and the summary data, the processor may be further configured to generate a translated GPU-executed program.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

It may sometimes be desirable to execute an application program originally written to be executed on a first GPU on a second GPU. However, programs sent to the second GPU may not be compiled to run on the second GPU due to differences in how the first GPU and the second GPU handle program binding. A computing system is described herein that addresses this issue.

Figure 1:
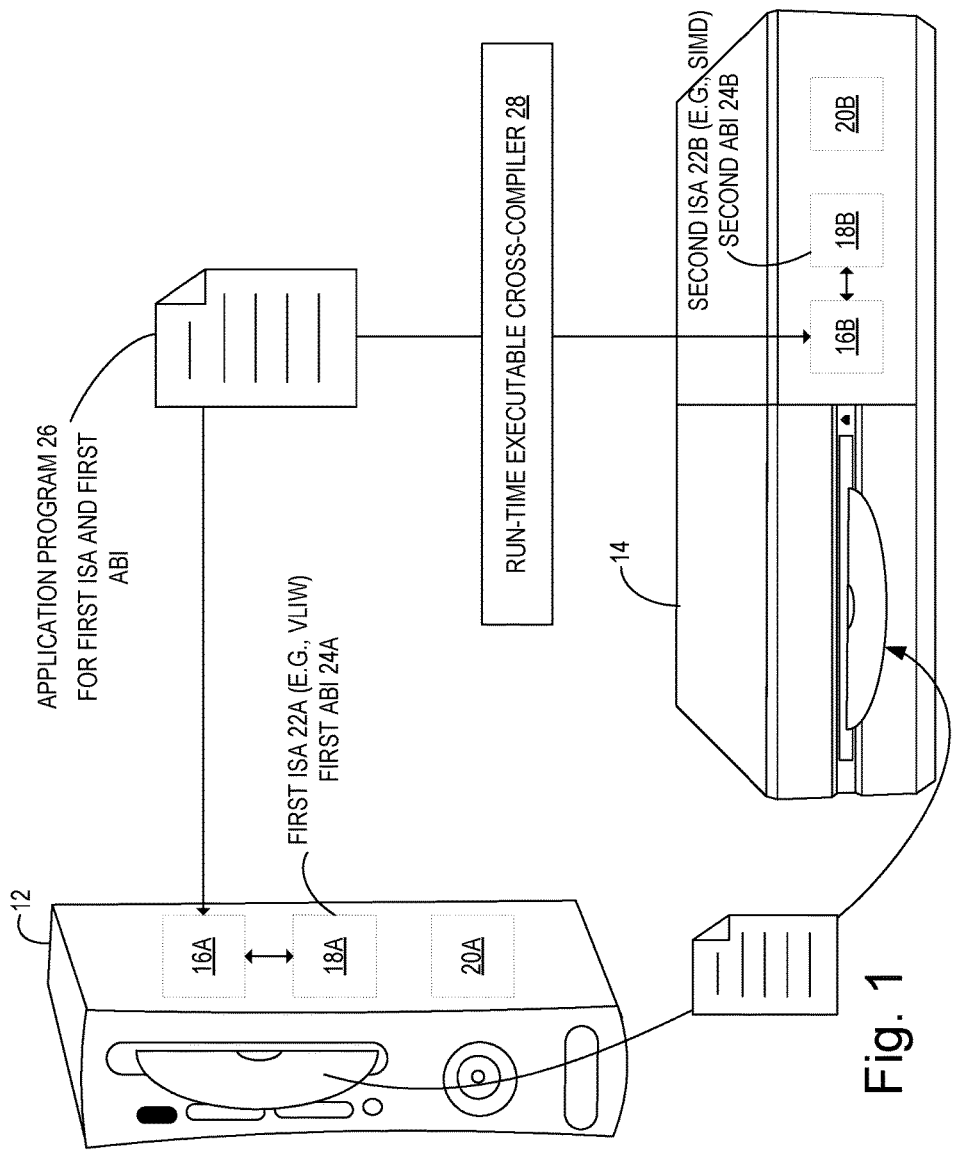
FIG. 1 illustrates a first computing device and a second computing device in the form of gaming consoles, according to one embodiment of the present disclosure.

FIG. 1 illustrates a first computing device 12 and a second computing device 14 in the form of gaming consoles. The first computing device 12 includes a first processor 16A, a first graphical processing unit (GPU) 18A, and other computing parts 20A including volatile memory, non-volatile memory, a power supply unit, etc. Similarly, the second computing device 14 includes a second processor 16B, a second GPU 18B, and other computing parts 20B. The respective processors and GPUs of the first and second computing devices 12 and 14 are configured to execute application programs, such as, for example, a game application. Additionally, the first and second computing devices 12 and 14 may take other suitable forms, such as, for example, desktop computers, laptops, head mounted display devices, etc.

In one example, the first GPU 18A of the first computing device 12 is architecturally distinct from the second GPU 18B of the second computing device 14. As shown in FIG. 1, the first GPU 18A has a first instruction set architecture (ISA) 22A and a first application binary interface (ABI) 24A, while the second GPU 18B has a second ISA 22B and a second ABI different from the first ISA 22A and first ABI 24A of the first GPU 18A. Due to architectural differences between the first GPU 18A and the second GPU 18B, application programs configured to be executed using the first processor 16A and first GPU 18A may not be successfully executed using the second processor 16B and second GPU 18B, and vice versa. For example, a compiled binary of an application program 26 may utilize GPU-executed programs configured to be executed on the first GPU 18A having the first ISA 22A and the first ABI 24A. Thus, as the compiled binary of the application program 26 was configured for the specific architecture of the processor 16A and GPU 18A of the first computing device 12, the application program 26 may be run natively on the first computing device 12 without needing modifications. However, the same compiled binary of the application program 26 is not binary compatible with the second ISA 22B and second ABI 24B of the second GPU 18B of the second computing device 14. Thus, the application program 26 will not successfully be executed on the second computing device 14 without modification.

In one specific example, the first ISA 22A may be an instruction-level parallelism, Very Long Instruction Word (VLIW) type of ISA. In an example VLIW ISA, a single instruction may consume up to twelve inputs and produce up to four outputs. Additionally, in the example VLIW ISA, a general purpose register (GPR) is a group of four individually addressable elements, and thus instructions may consume input from up to three GPR inputs and output to one GPR. The GPRs are generally equivalent, although some special purpose registers do exist. Memory operations are implemented by special instructions referencing special purpose hardware registers, and memory transactions appear as if they are completed instantly. The example VLIW ISA also expresses a further degree of explicit pipeline-parallelism in the form of instruction co-issues, where a first family of instructions may be concurrently issued with a second family of instructions, with co-mingled register usage.

On the other hand, the second ISA 22B may be a Simultaneous Instruction Multiple Data (SIMD) type of ISA where the same program is executed concurrently in lock-step on multiple streams of data. A typical instruction for an example SIMD ISA may consume up to three inputs and produces one output. In contrast to the example VLIW ISA, the GPRs of the example SIMD ISA are singular. Thus, instructions in the example SIMD ISA may consume input from up to three GPRs and output results to one GPR. In the example SIMD ISA, there are two families of GPR, each having different parallelism properties. Additionally, memory operations occur by special operations consuming GPRs, and memory transactions are initiated and then explicitly completed. In the example SIMD ISA, instruction parallelism is implicit in contrast to the explicit pipeline-parallelism of the example VLIW ISA.

Due to the differences in architecture and design discussed above, application programs utilizing GPU-executed programs specified for the example VLIW ISA and a corresponding ABI are not binary compatible with the SIMD ISA and a corresponding ABI. However, by taking these known differences into account, instructions for the example VLIW ISA may be translated to instructions for the example SIMD ISA via rules mapping. As illustrated in FIG. 1, the processor 16B of the second computing device 14 may execute a run-time executable cross compiler 28 configured to translate the compiled binary of the application program 26 such that the application program 26 may be executed by the processor 16B and GPU 18B of the second computing device 14. It will be appreciated that the above VLIW and SIMD examples for the first and second ISAs 22A and 22B and first and second ABIs 24A and 24B are merely exemplary, and that other types of binary incompatible ISAs and ABIs not specifically mentioned above may also be translated between by the computer implemented processes and methods, including the run-time executable cross-compiler 28, described herein.

Figure 2:
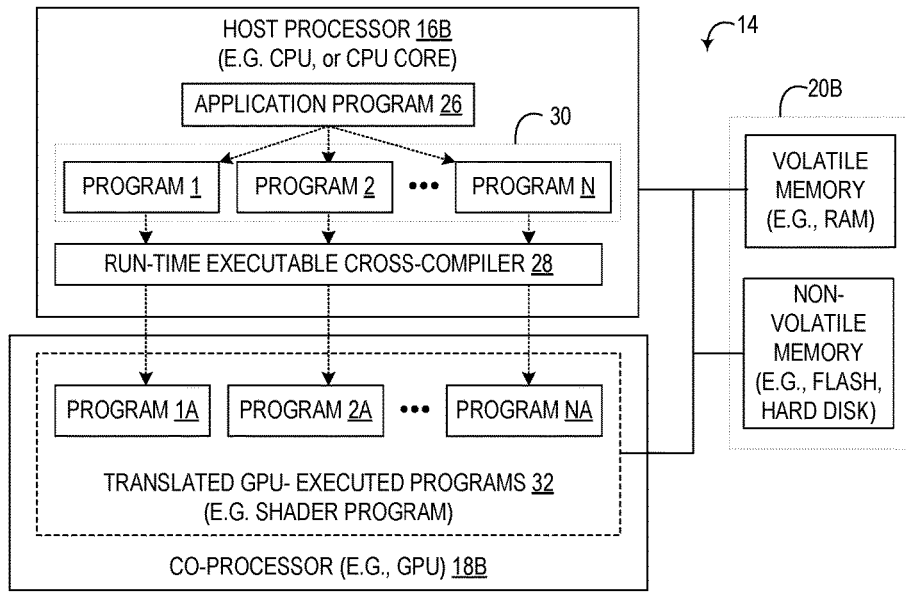
FIG. 2 illustrates an example computing device, according to the embodiment of FIG. 1.

FIG. 2 illustrates an example computing device, such as the second computing device 14, for just-in-time cross-compiling compiled binaries of application programs that utilize GPU-executed programs configured to be executed on a first GPU 18A having a first ISA 22A and a ABI 24A. As illustrated, in FIGS. 1 and 2, the second computing device 14 includes a co-processor, such as the second GPU 18B, having the second ISA 22B and second ABI 24B different from the first ISA 22A and first ABI 22B of the first GPU 18A. The second computing device 14 further includes a host processor, such as the second processor 16B, configured to execute an application program 26 that utilizes a plurality of GPU-executed programs 30 configured to be executed for the first ISA 22A and first ABI 24A of the first GPU 18A of the first computing device 12.

However, as discussed above, the plurality of GPU-executed programs 30 that are specified for the first ISA 22A and first ABI 24A cannot be executed by the second GPU 18B having the second ISA 22B and second ABI 24B without translation. Thus, the second processor 16B is further configured to execute a run-time executable cross-compiler 28 configured to, while the application program 26 is being executed, translate compiled binary of the plurality of GPU-executed programs 30 from the first ISA 22A to the second ISA 22B.

As illustrated in FIG. 2, GPU-executed programs, such as shader programs, are typically executed in a sequence of GPU-executed programs using a successive execution model. Thus, for an example rendering pipeline, the application program 26 may utilize a plurality of GPU-executed programs 30 arranged in a sequence, such as in the sequence program 1, program 2, ..., program N, illustrated in FIG. 2. The successive execution model creates semantic bindings between these programs in the sequence. When 'bound' into a particular sequence, a single GPU-executed program may continue to express the same semantics, but may modify how it communicates with peer GPU-executed programs in the sequence. For example, each GPU-executed program in the sequence may decode/encode inputs and outputs differently depending upon the other GPU-executed programs in the sequence. As another example, a GPU-executed program may elide specific outputs entirely, or ma assume 'default' values for specific inputs, depending upon the other GPU-executed programs in the sequence. As yet another example, the specific in-memory resources (data) that each GPU-executed program references including the exact input and output behavior is a function of the particular sequence of plurality of GPU-executed programs 30 and resources set. The particular rules of sequence and resource binding are a function of the GPU architecture and software stack, and may vary between GPU architectures.

The run-time executable cross-compiler 28 executed by the second processor 16B of the second computing device 14 is configured to translate a GPU-executed program compiled and bound for the first GPU 16A of the first computing device 12, such that the translated GPU-executed program meets all of the requirements and constraints of the second GPU 18B of the second computing device 14 when sequenced with a particular set of peers and resources. That is, the compiled binary of the application program 26 includes sequences of GPU-executed programs 30 that have already been compiled and bound according to the requirements and constraints of the first GPU 18A having the first ISA 22A and first ABI 24A. However, the requirements and constraints of the first GPU 18A are not the same as for the second GPU 18B due to architectural differences.

Thus, the run-time executable cross-compiler 28 analyzes a particular sequence of a plurality of GPU-executed programs 30 that are currently about to be executed during run-time of the application program 26, to determine summary data for the sequence including the peers of each GPU-executed program in the sequence, metadata that is stable with respect to GPU-executed program bindings in the sequence, and weakly bound data resources used during execution of the sequence. The run-time executable cross-compiler 28 then individually translates each GPU-executed program in the plurality of GPU-executed programs 30 while taking into account the determined summary data, such that the translated GPU-executed program meets all of the requirements and constraints of the second GPU 18B of the second computing device 14 for the particular set of peers and resources in the sequence.

In one example, the run-time executable cross-compiler 28 delays cross-compilation and translation of individual GPU-executed programs until a full sequence of a plurality of GPU-executed programs 30 is presented for execution. That is, the run-time executable cross-compiler 28 does not statically discover every GPU-executed program in isolation in the compiled binary of the application program 26. Starting with the compiled binary of a whole conventional program, it is generally not practical to find the embedded shader program listings and the semantics of their utilization. Attempting to do so directly would require statically evaluating all dynamically possible code paths to determine all possible shader programs and their arrangement into pipelines. Such a problem would be a form of the Halting Problem, and therefore would not have a computable solution. Instead, in one example, the run-time executable cross-compiler 28 translates GPU-executed programs, such as shader programs, as they are used by the application program 26 in a just-in-time manner. At the point in time that a GPU-executed program is about to be used by the application program 26, the entire sequence of the plurality of GPU-executed programs 30 is known, and thus does not require static discovery to determine the GPU-executed program and its execution context including the particular bindings in the sequence of GPU-executed programs.

At or near the point in time that a GPU-executed program is to be used by the application program 26, the run-time executable cross-compiler 28 inspects the entire sequence of peers of GPU-executed programs and gathers summary data. For example, when cross-compiling GPU-executed program 'program 1' from the sequence (program 1, program 2) illustrated in FIG. 2, the second GPU 18B→program 1→program 2 binding is fully computed and 'program 1' is translated to the second ISA 22B and second ABI 24B of the second GPU 18B. When 'program 2' is subsequently cross-compiled, the program 1→program 2→second GPU 18B binding is evaluated to exactly compatible results and 'program 2' is cross-compiled. In other words, the run-time executable cross-compiler 28 is stable with respect to a sequence of a plurality of GPU-executed programs 30, not just a single GPU-executed program.

In some examples, it is common for bindings to be compatible. That is, for both of the architectures of the first and second GPUs 18A and 18B, 'program 1' binds identically in the bindings (program 1, program 2) and (program 1, program N). In such circumstances a single cross-compilation of program 1 will be compatible for both bindings (program 1, program 2) and (program 1, program N). Thus, in this example, the run-time executable cross-compiler 28 is configured to identify bindings specific bindings in a sequence. In one specific example, the run-time executable cross-compiler 28 is configured to inspect a sequence of a plurality of GPU-executed programs 30, compute a binding between peer GPU-executed programs in the sequence, and then produce an output translation that is stable with respect to that identified binding. Further in this example, the run-time executable cross-compiler 28 may be configured to cache each cross-compilation result.

As illustrated in FIG. 2, at or near the point in time that a sequence of the plurality of GPU-executed programs 30 is to be utilized by the application program 26 during run-time, the run-time executable cross-compiler 28 translates each GPU-executed program that was compiled and bound for the first GPU 16A of the first computing device 12, such that the translated GPU-executed program meets all of the requirements and constraints of the second GPU 18B of the second computing device 14 including the bindings in the sequence. In the illustrated example, the sequence of GPU-executed programs 30 'program 1, program 2, . . . , program N' is translated to a corresponding sequence of translated GPU-executed programs 32 'program 1A, program 2A, . . . , program NA'. It will be appreciated that while a sequence of GPU-executed programs is translated into a sequence of translated GPU-executed programs having the same number of programs in a 1:1 translation in the example illustrated in FIG. 2, that each GPU-executed program may potentially be translated into any suitable number of translated GPU-executed programs. For example, a single GPU-executed program for the first ISA 22A and first ABI 24A of the first GPU 18A may be translated into zero to N GPU-executed programs for the second ISA 22B and second ABI 24B of the second GPU 18B depending upon the architectural differences between the GPUs.

Figure 3:
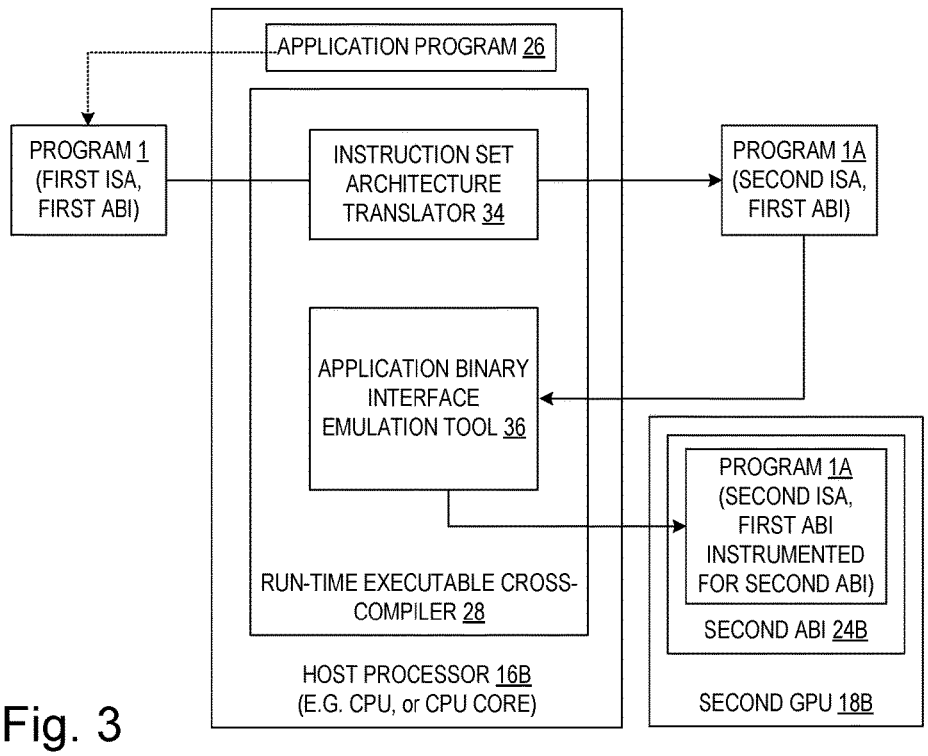
FIG. 3 shows an example run-time executable cross-compiler that includes an ISA translator and an ABI emulation tool, according to the embodiment of FIG. 1.

FIG. 3 shows an example run-time executable cross-compiler 28 that includes an ISA translator 34 and an ABI emulation tool 36. In the illustrated example, a GPU-executed program 'program 1' is processed by the ISA translator 34 of the run-time executable cross-compiler 28. The ISA translator 34 inspects the sequence of the plurality of GPU executed-programs 30 that includes the particular GPU-executed program 'program 1', gathers the summary data discussed above, and then translates the GPU-executed program 'program 1' that was compiled and bound for the first GPU 16A of the first computing device 12, such that the corresponding translated GPU-executed program 'program 1A' meets all of the requirements and constraints of the second GPU 18B of the second computing device 14 including the bindings in the sequence.

In one example, the ISA translator 34 is configured to translate each instruction of the first ISA 22A in the GPU-executed program 'program 1' to a corresponding zero to N instructions of the second ISA 22B based on rules mapping. Depending upon the specific GPU architectures, an instruction in the first ISA 22A does not always have an exact equivalent instruction in the second ISA 22B, such as in the example VLIW and SIMD architectural mismatch discussed previously. Thus, one instruction in the first ISA 22A may expand to zero instructions in the second ISA 22B when, for example, that instruction was peculiar to the hardware architecture of the first GPU 18A, or that instruction may be implicitly performed by the hardware of the second GPU 18B. In another example, one instruction in the first ISA 22A may expand to more than one instructions in the second ISA 22B, when, for example, multiple instructions from the second ISA 22B are required to be performed in sequence to perform a semantically equivalent function to that one instruction of the first ISA 22A.

In one specific example, the ISA translator 34 includes mappings between each instruction in the first ISA 22A and corresponding zero or more instructions in the second ISA 22B. That is, each particular instruction in the first ISA 22A is specifically mapped to zero or more particular instructions in the second ISA 22B, and the ISA translator 34 translates each GPU-executed program according to the mappings. In one example, the mappings are binary instruction to binary instruction. That is, the run-time executable cross-compiler 28 including the ISA translator 34 operates in a binary domain, and is configured to translate the plurality of GPU-executed programs 30 without inflation to an intermediate representation including a control flow graph. Thus, it will be appreciated that the run-time executable cross-compiler 28 is not recompiling source code or generating a higher level code representation and/or control flow graph of the already compiled binary of the GPU-executed programs before producing the translated GPU-executed programs. Rather, in one example, the run-time executable cross-compiler 28 is configured to perform binary-to-binary translations of first ISA 22A instructions of the untranslated GPU-executed program to second ISA 22B instructions for the translated GPU-executed program.

In one example, the run-time executable cross-compiler is configured to translate the plurality of GPU-executed programs 30 without co-mingling first ISA 22A instructions of the plurality of GPU-executed programs 30. That is, the sequence of first ISA 22A instructions in a particular GPU-executed program is not changed during translation by the run-time executable cross-compiler 28. For example, the run-time executable cross-compiler 28 does not rearrange or combine first ISA 22A instructions that will be translated. In one specific example, any given instruction including operands in the first ISA 22A for a GPU-executed program always expands to the same corresponding sequence of instructions for the second ISA 22B. This consistent instruction translation design ensures that the translation from the first ISA 22A to the second ISA 22B may proceed in static program order but operate equivalently for any arbitrary execution order, regardless of data-dependent flow control/execution mask decisions and complexity.

After translation by the ISA translator 34, the translated GPU-executed programs 32 include instructions from the second ISA 22B corresponding to instructions from the first ISA 22A, such that the translated GPU-executed programs 32 may execute to semantically equivalent results in the second GPU 18B as the untranslated GPU-executed programs 30 would execute to with the first GPU 18A. However, the translated GPU-executed programs 32 are still configured according to the rules of the first ABI 24A, such as GPR usage patterns, coordinate system for inputs, encoding, GPR locations, scope of execution, and other characteristics of the first ABI 24A.

Thus, in one example, the run-time executable cross-compiler 28 further includes an ABI emulation tool 36 that is configured to emulate the first ABI 24A using the hardware resources of the second GPU 18B, which includes translating between the first ABI 24A of the first GPU 18A and second ABI 24B of the second GPU 18B at the entry and exit points of the plurality of translated GPU-executed programs 32. In the example illustrated in FIG. 3, the ISA translator 34 translates one GPU-executed program 'program 1' from the first ISA 22A to the second ISA 22B, producing the translated GPU-executed program 'program 1A'. However, the translated GPU-executed program 'program 1A' is still configured according to the rules of the first ABI 24A, such as GPR usage patterns, coordinate system for inputs, encoding, GPR locations, scope of execution, and other characteristics of the first ABI 24A. Thus, without ABI emulation, the translated GPU-executed program 'program 1A' may not correctly execute on the second GPU 18B.

In one example, to emulate the first ABI 24A, the ABI emulation tool 36 of the run-time executable cross-compiler 28 is configured to translate from the second ABI 24B to the first ABI 24A before execution of a translated GPU-executed program 32, and translate from the first ABI 24A to the second ABI 24B after execution of the translated GPU-executed program 32. In this manner, the rules of the first ABI 24A is nested inside the rules of the second ABI 24B. In one specific example, the ABI emulation tool 36 may be configured to rearrange and reassign inputs and outputs to the GPRs of the second GPU 18B to emulate the GPR behavior of the first ABI 24A for the first GPU 18A. In the VLIW vs SIMD ISA example, GPRs in the VLIW ISA and associated ABI is a group of four individually addressable elements, while GPRs in the SIMD ISA and associated ABI is a singular. Thus, to emulate the VLIW and associated ABI GPRs using the SIMD ISA and associated ABI GPRs, the ABI emulation tool 36 may be configured to assign four GPRs of the SIMD ISA together to emulate one GPR of the VLIW ISA. By associating GPRs together in this manner, the ABI emulation tool 36 may emulate the GPR environment and rules of the first GPU 18A using the hardware resources of the second GPU 18B. Similarly, the ABI emulation tool 36 may be configured to emulate each characteristic of the first ABI 24A, such as coordinate system for inputs, encoding, GPR usage patterns, scope of execution, etc., using the rules of the second ABI 24B and the hardware resources of the second GPU 18B.

As discussed above, the ABI emulation tool 36 is configured to translate from the second ABI 24B to the first ABI 24A before execution of a translated GPU-executed program 32, and translate from the first ABI 24A to the second ABI 24B after execution of the translated GPU-executed program 32. By nesting the first ABI 24A inside the second ABI 24B, from the perspective of the sequence of translated GPU-programs 32, they are being executed within a first ABI 24A environment. On the other hand, from the perspective of the hardware of the second GPU 18B, the inputs and outputs to the sequence of translated GPU-programs 32 conforms to the rules and characteristics of the second ABI 24B. That is, each input/communication from the second GPU 18B to the sequence of translated GPU-executed programs 32 conforms to the rules of the second ABI 24B, but are appropriately translated from the second ABI 24B to the first ABI 24A such that a translated GPU-executed program receives input/communication conforming to the rules of the first ABI 24A. Additionally, each output/communication from the sequence of translated GPU-executed programs 32 to the second GPU 18B conforms to the rules of the first ABI 24A, but are appropriately translated from the first ABI 24A to the second ABI 24B such that the hardware/software of the second GPU 18B receives output/communication conforming to the rules of the second ABI 24B.

As illustrated in FIG. 3, after translation by the ISA translator 34 and emulation by the ABI emulation tool 36 of the run-time executable cross-compiler 28, the second processor 16B of the second computing device 14 may proceed to execute the plurality of translated GPU-executed programs 32 on the second GPU 18B. The results of execution of the plurality of translated GPU-executed programs 32 may then be returned to the application program 26 currently being executed.

It will be appreciated that while the example illustrated in FIG. 3 conceptually shows that the ISA translator 34 and the ABI emulation tool 36 operate sequentially, that the run-time executable cross-compiler may execute both steps either concurrently as part of one translation step, or sequentially as shown. In another example, the run-time executable cross-compiler 28 may execute either of the ISA translator 34 and the ABI emulation tool 36 without the other. In one specific example, the ISA of a particular GPU architecture may evolve/change over time while the underlying hardware and ABI remain unchanged. Thus, the run-time executable cross-compiler 28 may be configured to only translate GPU-executed programs from a first ISA to a second ISA, and not translate/emulate between ABIs as the ABI and hardware resources of the GPU have not changed. In another specific example, the drivers of a GPU may be updated such that the current ABI of the GPU is incompatible with the previous ABI of that GPU, without changing the ISA for that GPU. Thus, the run-time executable cross-compiler 28 may be configured to only emulate/translate between a first ABI and a second ABI, and not translate between ISAs as the ISA for that GPU has not changed.

Figure 4:
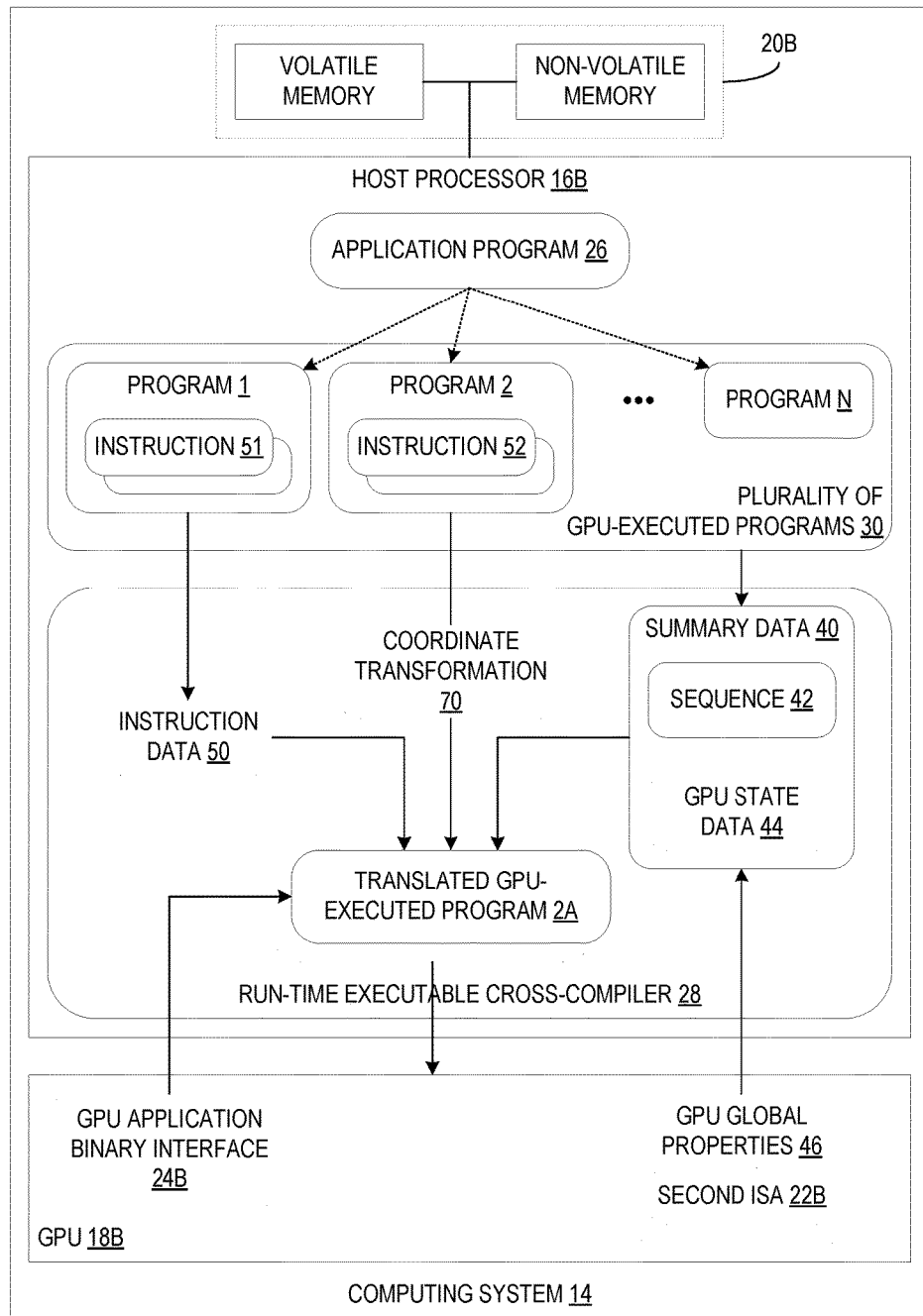
FIG. 4 shows an example computing system including a GPU and a host processor, according to the embodiment of FIG. 1.

The cross-compilation of a sequence of GPU-executed programs is further described below with reference to FIGS. 4-7. Turning now to FIG. 4, a computing system, which may be the computing device 14 of FIG. 1, is shown according to an example embodiment of the present disclosure. The computing system 14 includes a GPU 18B and a host processor 16B configured to execute a run-time executable cross-compiler 28. The host processor 16B is configured to receive a GPU-executed program of a plurality of GPU-executed programs 30. In the example embodiment shown in FIG. 4, the plurality of GPU-executed programs 30 are received from an application program 26 executed by the host processor 16B. Each program of the plurality of GPU-executed programs 30 may include one or more instructions. As shown in FIG. 4, GPU-executed program 1 includes one or more instructions 51 and program 2 includes one or more instructions 52.

The host processor 16B is further configured to receive summary data 40 associated with the GPU-executed program. The summary data 40 includes a sequence 42 in which the plurality of GPU-executed programs 30 are configured to be executed. In some embodiments, the summary data 40 may further include GPU state data 44 that indicates one or more global properties 46 of the GPU 18B. The one or more global properties 46 of the GPU 18B may include an ISA 24B of the GPU 18B that includes a description of operations that may be executed on the GPU 18B. Other data may also be included in the summary data 40.

In some embodiments, the host processor 16B may be further configured to determine instruction data 50 indicating one or more instructions included in at least one other GPU-executed program of the plurality of GPU-executed programs 30. The instructions may be encoded in the first ABI 24A, as shown in FIG. 2. In such embodiments, the host processor 16B may be further configured to determine instruction data 50 for each GPU-executed program of the plurality of GPU-executed programs 30. Embodiments in which the host processor 16B is configured to determine instruction data 50 for at least one other GPU-executed program of the plurality of GPU-executed programs 30, but not for each GPU-executed program, are also contemplated.

Based at least in part on the GPU-executed program and the summary data 40, the host processor 16B is further configured to generate a translated GPU-executed program. As shown in FIG. 4, translated GPU-executed program 2A is generated based at least on program 2 and the summary data 40. The translated GPU-executed program may be configured to be executed in a GPU ABI 24B of the GPU 18B, as shown in FIG. 3. The host processor 16B may generate the translated GPU-executed program as described above with reference to FIG. 3. In embodiments in which the host processor 16B is configured to determine instruction data 50 indicating one or more instructions included in at least one other GPU-executed program, the translated GPU-executed program may be generated based at least in part on the instruction data 50. In such embodiments, the instruction data 50 determined for the at least one other GPU-executed program may also be used to generate the translated GPU-executed program. Also, in embodiments in which the host processor 16B is configured to determine instruction data 50 indicating one or more instructions included in at least one other GPU-executed program, generating the translated GPU-executed program may include adding to the GPU-executed program one or more instructions included in the at least one other GPU-executed program. The one or more instructions from the at least one other GPU-executed program may be added, for example, when an instruction at the end of a first program is moved to the beginning of a second program when the run-time executable cross-compiler 28 generates the translated GPU-executed program. Additionally or alternatively, generating the translated GPU-executed program may include removing one or more instructions from the GPU-executed program. For example, one or more instructions may be removed when an instruction is determined by the run-time executable cross-compiler 28 to have no effect when executed in the ABI 24B of the GPU 18B.

Figure 5:
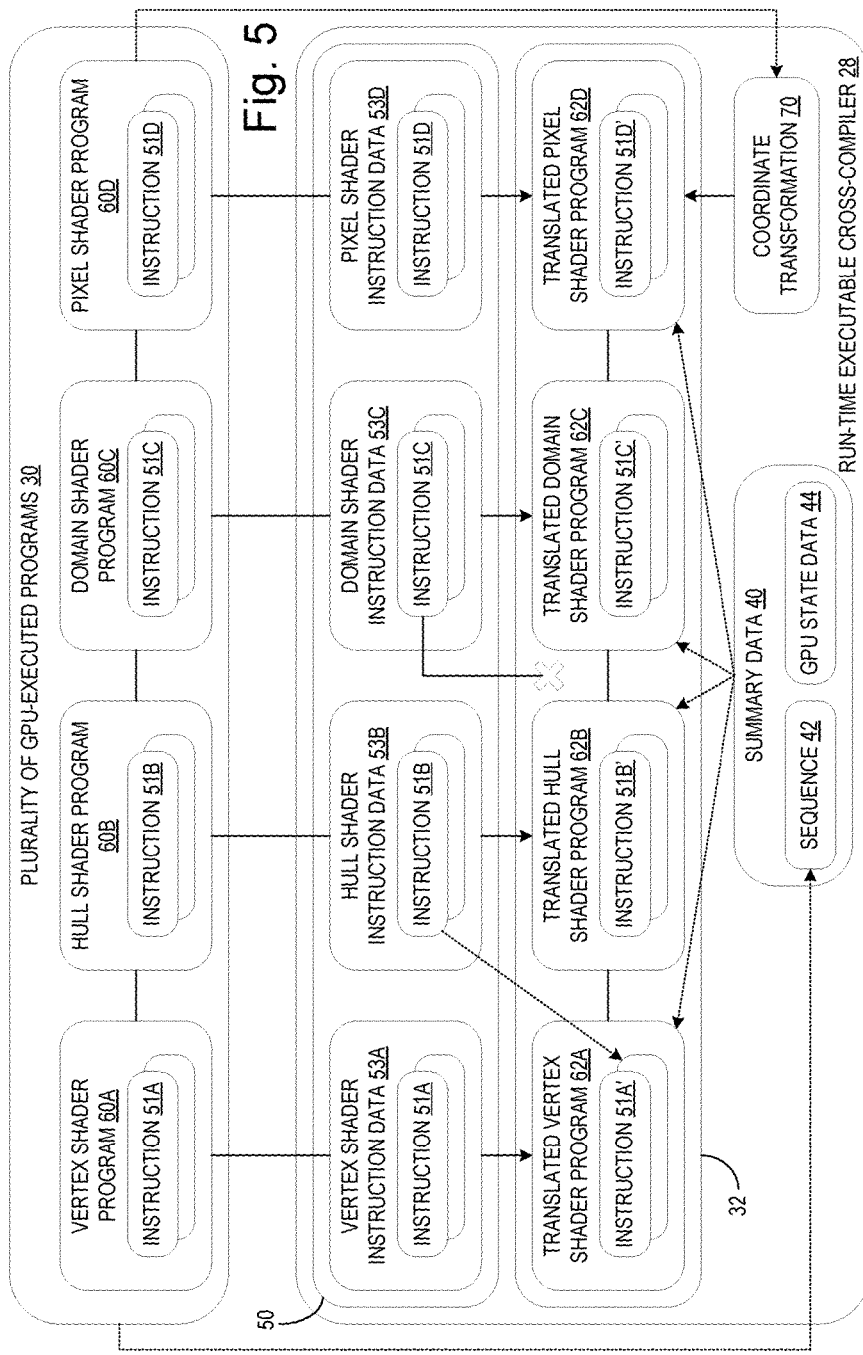
FIG. 5 shows an example run-time executable cross-compiler configured to translate a plurality of GPU-executed shader programs, according to the embodiment of FIG. 1.

In some embodiments of the present disclosure, each GPU-executed program of the plurality of GPU-executed programs 30 may be a shader program. The plurality of GPU-executed programs may include at least one pixel shader program. Additionally or alternatively, the plurality of GPU-executed programs 30 may include at least one vertex shader program, hull shader program, domain shader program, geometry shader program, or some other type of shader program. An embodiment in which each GPU-executed program of the plurality of GPU-executed programs 30 is a shader program is depicted in FIG. 5. In the embodiment of FIG. 5, the plurality of GPU-executed programs 30 includes a vertex shader program 60A, a hull shader program 60B, a domain shader program 60C, and a pixel shader program 60D. Each of the vertex shader program 60A, the hull shader program 60B, the domain shader program 60C, and the pixel shader program 60D shown in FIG. 5 includes a plurality of instructions 51A, 51B, 51C, and 51D respectively. The instructions 51A, 51B, 51C, and 51D may be encoded in the first ABI 24A.

The run-time executable cross-compiler 28 shown in FIG. 5 is configured to receive summary data 40 including the sequence 42 in which the plurality of GPU-executed programs 30 are configured to be executed. The summary data 40 further includes GPU state data 44 indicating one or more global properties 46 of the GPU 18B. The run-time executable cross-compiler 28 shown in FIG. 5 is further configured to receive instruction data 50 indicating the instructions included in each GPU-executed program of the plurality of GPU-executed programs 30. The instruction data includes vertex shader instruction data 53A, as well as hull shader instruction data 53B, domain shader instruction data 53C, and pixel shader instruction data 53D for shader programs 60A, 60B, 60C, and 60D respectively.

The run-time executable cross-compiler 28 then generates a translated GPU-executed program for each GPU-executed program, based on at least the summary data 40, the GPU-executed programs, and the instruction data 50. The plurality of translated GPU-executed programs 32 generated in the embodiment of FIG. 5 include a translated vertex shader program 62A, a translated hull shader program 62B, a translated domain shader program 62C, and a translated pixel shader program 62D. Each translated GPU-executed program is configured to be executed in the GPU ABI 24B, and includes one or more instructions. The translated vertex shader programs 62A, 62B, 62C, and 62D include one or more instructions 51A', 51B', 51C', and 51D' respectively. In the embodiment shown in FIG. 5, generating the translated vertex shader program 62 includes adding an instruction 51B included in the hull shader program 60B to the vertex shader program 60A. In addition, generating the translated domain shader program 62C includes removing an instruction 51C from the domain shader program 60C.

For each GPU-executed program of the plurality of GPU-executed programs 30, generating the translated GPU-executed program may include applying a coordinate transformation 70 to at least one output of the GPU-executed program. For example, the run-time executable cross-compiler 28 may change a display aspect ratio used by the GPU-executed program when generating the translated GPU-executed program. In the embodiment of FIG. 5, a coordinate transformation 70 is applied to the pixel shader program 60D when the run-time executable cross-compiler 28 generates the translated pixel shader program 62D.

Figure 6:
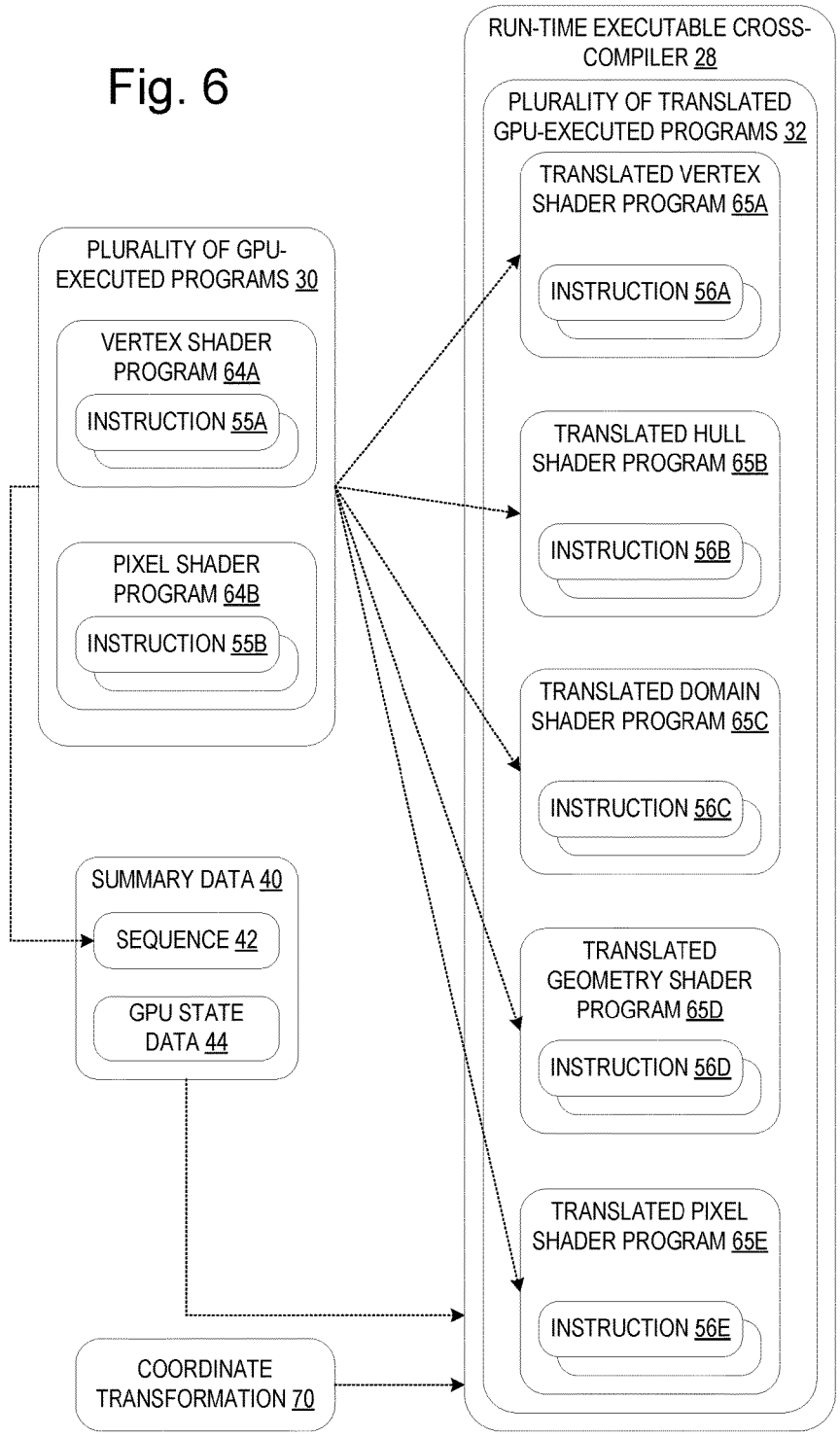
FIG. 6 shows an example run-time executable cross-compiler configured to translate a plurality of GPU-executed tessellation shader programs, according to the embodiment of FIG. 1.

In some embodiments of the present disclosure, the host processor 16B may be further configured to generate a plurality of translated GPU-executed programs 32 based at least in part on the GPU-executed program and the summary data 40. The plurality of translated GPU-executed programs 32 may also be generated based at least in part on the instruction data 50. In such embodiments, the GPU-executed programs may be tessellation shader programs, and the host processor 16B may be configured to generate a plurality of translated tessellation shader programs based at least in part on two or more GPU-executed programs of the plurality of GPU-executed programs 30. The plurality of translated tessellation shader programs may include one or more vertex shaders, hull shaders, domain shaders, geometry shaders, and/or pixel shaders. FIG. 6 shows an example embodiment in which a vertex shader program 64A and a pixel shader program 64B are translated by the run-time executable cross-compiler 28 to generate a translated vertex shader program 65A, a translated hull shader program 65B, a translated domain shader program 65C, a translated geometry shader program 65D, and a translated pixel shader program 65E. In the embodiment of FIG. 6, the vertex shader program 64A includes one or more instructions 55A, and the pixel shader program 64B includes one or more instructions 55B. Each of the translated GPU-executed programs 65A, 65B, 65C, 65D, and 65E may include one or more of the instructions 55A and 55B from the vertex shader and pixel shader programs 64A and 64B respectively, translated to be executed in the ABI 24B of the GPU 18B. In addition, a coordinate transformation 70 may be applied to outputs of one or both of the vertex shader and pixel shader programs 64A and 64B in generating the translated GPU-executed programs 65A, 65B, 65C, 65D, and 65E.

Figure 7:
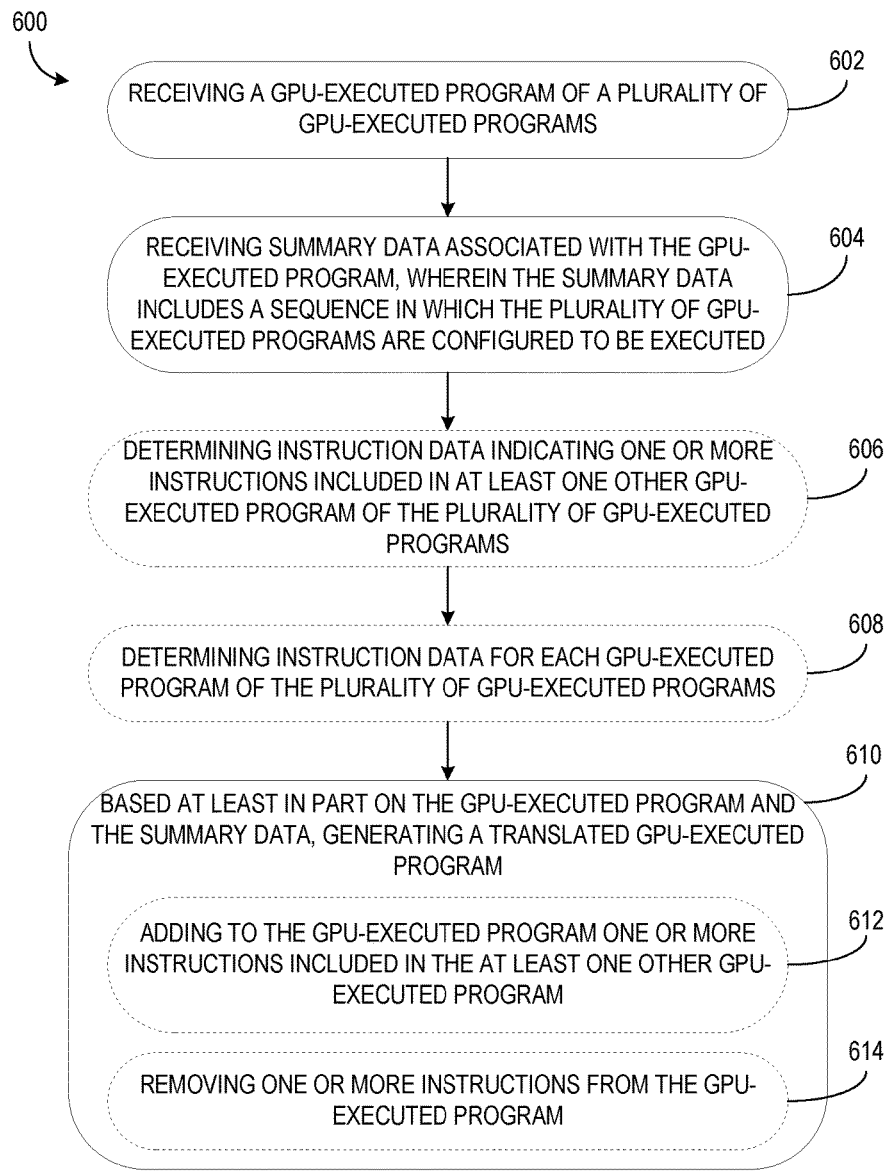
FIG. 7 shows a flowchart of a method for executing a runtime-executable cross-compiler on a processor of a computing system, according to one embodiment of the present disclosure.

FIG. 7 shows a flowchart of a method 600 that may be used for executing a runtime-executable cross-compiler on a processor of a computing system. The computing system may be the computing system 14 of FIG. 1. At step 602, the method includes receiving a GPU-executed program of a plurality of GPU-executed programs. The GPU-executed program may be received from an application program executed by the processor. In some embodiments, each GPU-executed program of the plurality of GPU-executed programs may be a shader program. In such embodiments, each of the shader programs may be a vertex shader, pixel shader, or tessellation shader program.

At step 604, the method 600 may further include receiving summary data associated with the GPU-executed program, wherein the summary data includes a sequence in which the plurality of GPU-executed programs are configured to be executed. In some embodiments, the summary data may further include GPU state data that indicates one or more global properties of the GPU. The one or more global properties of the GPU may include an ISA of the GPU.

Some implementations may optionally include step 606, at which the method 600 may include determining instruction data indicating one or more instructions included in at least one other GPU-executed program of the plurality of GPU-executed programs. In such implementations, the method 600 may further include, at step 608, determining instruction data for each GPU-executed program of the plurality of GPU-executed programs.

At step 610, the method 600 further includes, based at least in part on the GPU-executed program and the summary data, generating a translated GPU-executed program. In implementations in which the method 600 includes determining instruction data indicating one or more instructions included in at least one other GPU-executed program of the plurality of GPU-executed programs, the translated GPU-executed program may be generated based at least in part on the instruction data. In such implementations, step 610 may further include, at step 612, adding to the GPU-executed program one or more instructions included in the at least one other GPU-executed program. Step 610 may additionally or alternatively include, at step 612, removing one or more instructions from the GPU-executed program.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
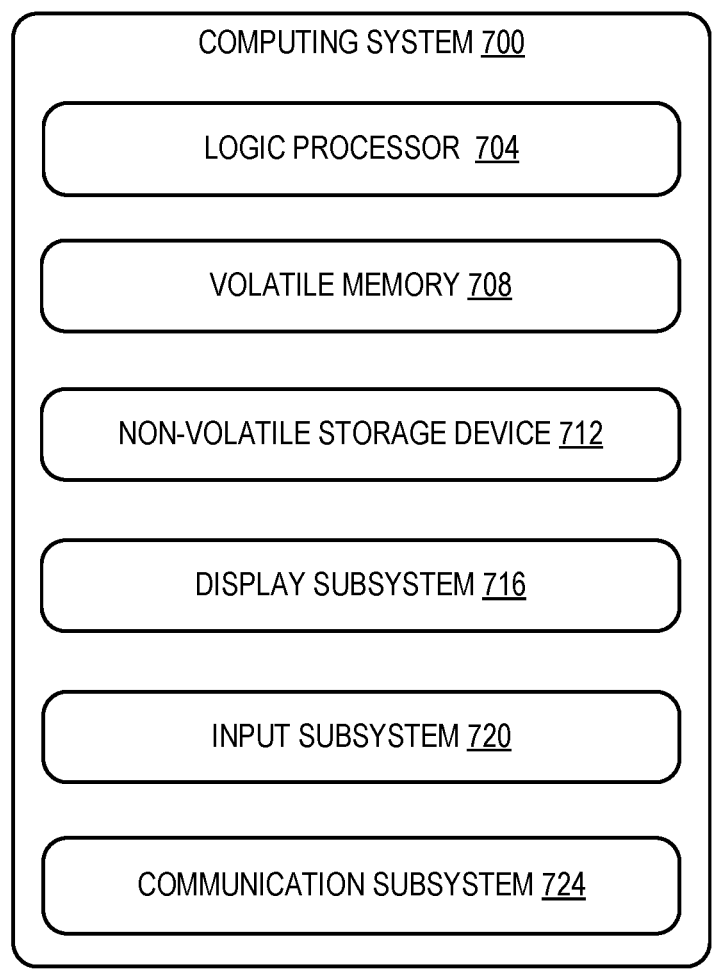
FIG. 8 shows a schematic representation of an example computing system, according to one embodiment of the present disclosure.

FIG. 8 schematically shows a non-limiting embodiment of a computing system 700 that can enact one or more of the methods and processes described above. Computing system 700 is shown in simplified form. Computing system 700 may embody the computing device of FIG. 1. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 704, volatile memory 708, and a non-volatile storage device 712. Computing system 700 may optionally include a display subsystem 716, input subsystem 720, communication subsystem 724, and/or other components not shown in FIG. 8.

Logic processor 704 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 704 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 708 may include physical devices that include random access memory. Volatile memory 708 is typically utilized by logic processor 704 to temporarily store information during processing of software instructions. It will be appreciated that volatile memory 708 typically does not continue to store instructions when power is cut to the volatile memory 708.

Non-volatile storage device 712 includes one or more physical devices configured to hold instructions executable by the logic processors to implement the methods and processes described herein. When such methods and processes are implemented, the state of non-volatile storage device 712 may be transformed—e.g., to hold different data.

Non-volatile storage device 712 may include physical devices that are removable and/or built-in. Non-volatile storage device 712 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 712 may include nonvolatile, dynamic, static, read/write, read-only, sequential-access, location-addressable, file-addressable, and/or content-addressable devices. It will be appreciated that non-volatile storage device 712 is configured to hold instructions even when power is cut to the non-volatile storage device 712.

Aspects of logic processor 704, volatile memory 708, and non-volatile storage device 712 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 700 implemented to perform a particular function. In some cases, a program may be instantiated via logic processor 704 executing instructions held by non-volatile storage device 712, using portions of volatile memory 708. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 716 may be used to present a visual representation of data held by non-volatile storage device 712. As the herein described methods and processes change the data held by the non-volatile storage device, and thus transform the state of the non-volatile storage device, the state of display subsystem 716 may likewise be transformed to visually represent changes in the underlying data. Display subsystem 716 may include one or more display devices utilizing virtually any type of technology. Such display devices may be combined with logic processor 704, volatile memory 708, and/or non-volatile storage device 712 in a shared enclosure, or such display devices may be peripheral display devices.

When included, input subsystem 720 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; as well as electric-field sensing componentry for assessing brain activity; and/or any other suitable sensor.

When included, communication subsystem 724 may be configured to communicatively couple computing system 700 with one or more other computing devices. Communication subsystem 724 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

According to one aspect of the present disclosure, a computing system is provided, comprising a graphical processing unit (GPU) and a processor configured to execute a run-time executable cross-compiler. The processor may be configured to receive a GPU-executed program of a plurality of GPU-executed programs. The processor may be further configured to receive summary data associated with the GPU-executed program. The summary data may include a sequence in which the plurality of GPU-executed programs are configured to be executed. The processor may be further configured to, based at least in part on the GPU-executed program and the summary data, generate a translated GPU-executed program.

According to this aspect, the cross-compiled program may be configured to be executed in a GPU application binary interface (ABI) of the GPU.

According to this aspect, the processor may be further configured to determine instruction data indicating one or more instructions included in at least one other GPU-executed program of the plurality of GPU-executed programs. The cross-compiled program may be generated based at least in part on the instruction data. According to this aspect, the processor may be further configured to determine instruction data for each GPU-executed program of the plurality of GPU-executed programs. According to this aspect, generating the cross-compiled program may include adding to the GPU-executed program one or more instructions included in the at least one other GPU-executed program. According to this aspect, generating the translated GPU-executed program may include removing one or more instructions from the GPU-executed program.

According to this aspect, each GPU-executed program of the plurality of GPU-executed programs may be a shader program. According to this aspect, the plurality of GPU-executed programs may include at least one vertex shader program. According to this aspect, the plurality of GPU-executed programs may include at least one pixel shader program. According to this aspect, the processor may be further configured to generate a plurality of translated GPU-executed programs based at least in part on the GPU-executed program and the summary data. According to this aspect, the processor may be configured to generate a plurality of translated tessellation shader programs based at least in part on two or more GPU-executed programs of the plurality of GPU-executed programs. According to this aspect, generating the translated GPU-executed program may include applying a coordinate transformation to at least one output of the GPU-executed program.

According to this aspect, the summary data may further include GPU state data that indicates one or more global properties of the GPU. According to this aspect, the one or more global properties of the GPU may include an instruction set architecture (ISA) of the GPU.

According to another aspect of the present disclosure, a method for executing a runtime-executable cross-compiler on a processor of a computing system is provided. The method may comprise receiving a GPU-executed program of a plurality of GPU-executed programs. The method may further comprise receiving summary data associated with the GPU-executed program. The summary data may include a sequence in which the plurality of GPU-executed programs are configured to be executed. The method may further comprise, based at least in part on the GPU-executed program and the summary data, generating a translated GPU-executed program.

According to this aspect, the method may further comprise determining instruction data indicating one or more instructions included in at least one other GPU-executed program of the plurality of GPU-executed programs. The translated GPU-executed program may be generated based at least in part on the instruction data. According to this aspect, the method may further comprise determining instruction data for each GPU-executed program of the plurality of GPU-executed programs. According to this aspect, generating the translated GPU-executed program may include adding to the GPU-executed program one or more instructions included in the at least one other GPU-executed program and/or removing one or more instructions from the GPU-executed program.

According to this aspect, each GPU-executed program of the plurality of GPU-executed programs may be a shader program.

According to another aspect of the present disclosure, a computing system is provided, comprising a graphical processing unit (GPU) and a processor configured to execute a run-time executable cross-compiler. The processor may be configured to receive a GPU-executed program of a plurality of GPU-executed programs. Each GPU-executed program of the plurality of GPU-executed programs may be a shader program. The processor may be further configured to receive summary data associated with the GPU-executed program. The summary data may include a sequence in which the plurality of GPU-executed programs are configured to be executed. The processor may be further configured to determine instruction data indicating instructions included in at least one other GPU-executed program of the plurality of GPU-executed programs. The processor may be further configured to, based at least in part on the GPU-executed program, the summary data, and the instruction data, generate a translated GPU-executed program.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
a graphical processing unit (GPU); and
a processor configured to execute a run-time executable cross-compiler to:
receive a GPU-executed program of a plurality of GPU-executed programs;
receive summary data associated with the GPU-executed program, wherein the summary data includes a sequence in which the plurality of GPU-executed programs are configured to be executed; and
based at least in part on the GPU-executed program and the summary data, generate a translated GPU-executed program.

2. The computing system of claim 1, wherein the cross-compiled program is configured to be executed in a GPU application binary interface (ABI) of the GPU.

3. The computing system of claim 1, wherein the processor is further configured to determine instruction data indicating one or more instructions included in at least one other GPU-executed program of the plurality of GPU-executed programs, and wherein the cross-compiled program is generated based at least in part on the instruction data.

4. The computing system of claim 3, wherein the processor is further configured to determine instruction data for each GPU-executed program of the plurality of GPU-executed programs.

5. The computing system of claim 3, wherein generating the cross-compiled program includes adding to the GPU-executed program one or more instructions included in the at least one other GPU-executed program.

6. The computing system of claim 3, wherein generating the translated GPU-executed program includes removing one or more instructions from the GPU-executed program.

7. The computing system of claim 1, wherein each GPU-executed program of the plurality of GPU-executed programs is a shader program.

8. The computing system of claim 7, wherein the plurality of GPU-executed programs includes at least one vertex shader program.

9. The computing system of claim 7, wherein the plurality of GPU-executed programs includes at least one pixel shader program.

10. The computing system of claim 7, wherein the processor is further configured to generate a plurality of translated GPU-executed programs based at least in part on the GPU-executed program and the summary data.

11. The computing system of claim 10, wherein the processor is configured to generate a plurality of translated tessellation shader programs based at least in part on two or more GPU-executed programs of the plurality of GPU-executed programs.

12. The computing system of claim 7, wherein generating the translated GPU-executed program includes applying a coordinate transformation to at least one output of the GPU-executed program.

13. The computing system of claim 1, wherein the summary data further includes GPU state data that indicates one or more global properties of the GPU.

14. The computing system of claim 13, wherein the one or more global properties of the GPU include an instruction set architecture (ISA) of the GPU.

15. A method for executing a runtime-executable cross-compiler on a processor of a computing system, the method comprising:
receiving a GPU-executed program of a plurality of GPU-executed programs;
receiving summary data associated with the GPU-executed program, wherein the summary data includes a sequence in which the plurality of GPU-executed programs are configured to be executed; and based at least in part on the GPU-executed program and the summary data, generating a translated GPU-executed program.

16. The method of claim 15, further comprising determining instruction data indicating one or more instructions included in at least one other GPU-executed program of the plurality of GPU-executed programs, and wherein the translated GPU-executed program is generated based at least in part on the instruction data.

17. The method of claim 16, further comprising determining instruction data for each GPU-executed program of the plurality of GPU-executed programs.

18. The method of claim 16, wherein generating the translated GPU-executed program includes adding to the GPU-executed program one or more instructions included in the at least one other GPU-executed program and/or removing one or more instructions from the GPU-executed program.

19. The method of claim 15, wherein each GPU-executed program of the plurality of GPU-executed programs is a shader program.

20. A computing system, comprising:
a graphical processing unit (GPU); and
a processor configured to execute a run-time executable cross-compiler to:
receive a GPU-executed program of a plurality of GPU-executed programs, wherein each GPU-executed program of the plurality of GPU-executed programs is a shader program;
receive summary data associated with the GPU-executed program, wherein the summary data includes a sequence in which the plurality of GPU-executed programs are configured to be executed;
determine instruction data indicating instructions included in at least one other GPU-executed program of the plurality of GPU-executed programs; and
based at least in part on the GPU-executed program, the summary data, and the instruction data, generate a translated GPU-executed program.

* * * * *